Figure 1:
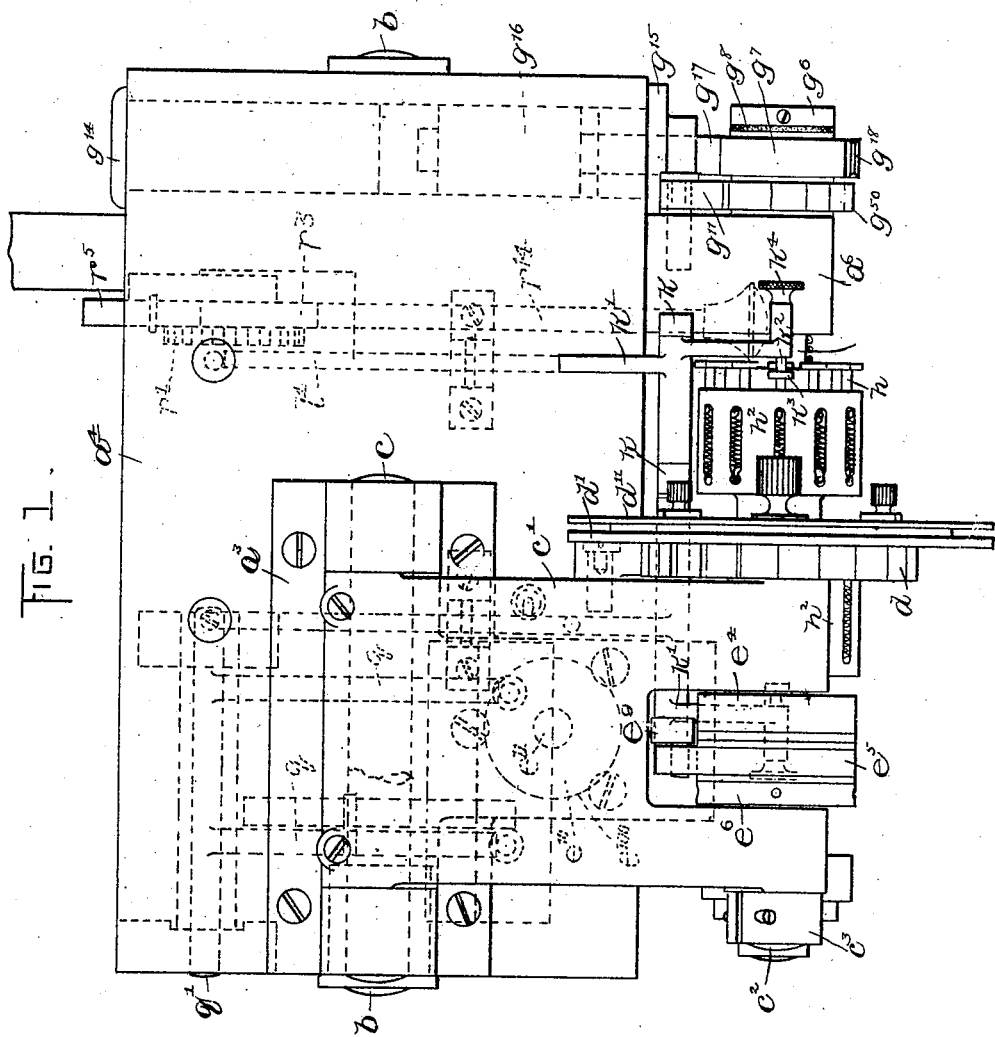

No. 809,248. PATENTED JAN. 2, 1906.
D. H. CHURCH, DEC'D.
H. L. CHURCH, EXECUTRIX.
MACHINE FOR GAGING PIVOTS.
APPLICATION FILED MAY 5, 1898.

9 SHEETS—SHEET 5.

WITNESSES:
A. D. Harrison.
P. W. Pezzetti.

INVENTOR:
Duane H. Church
by Wright, Brown & Quimby
Attys.

No. 809,248. PATENTED JAN. 2, 1906.
D. H. CHURCH, DEC'D.
H. L. CHURCH, EXECUTRIX.
MACHINE FOR GAGING PIVOTS.
APPLICATION FILED MAY 5, 1898.
9 SHEETS—SHEET 6.
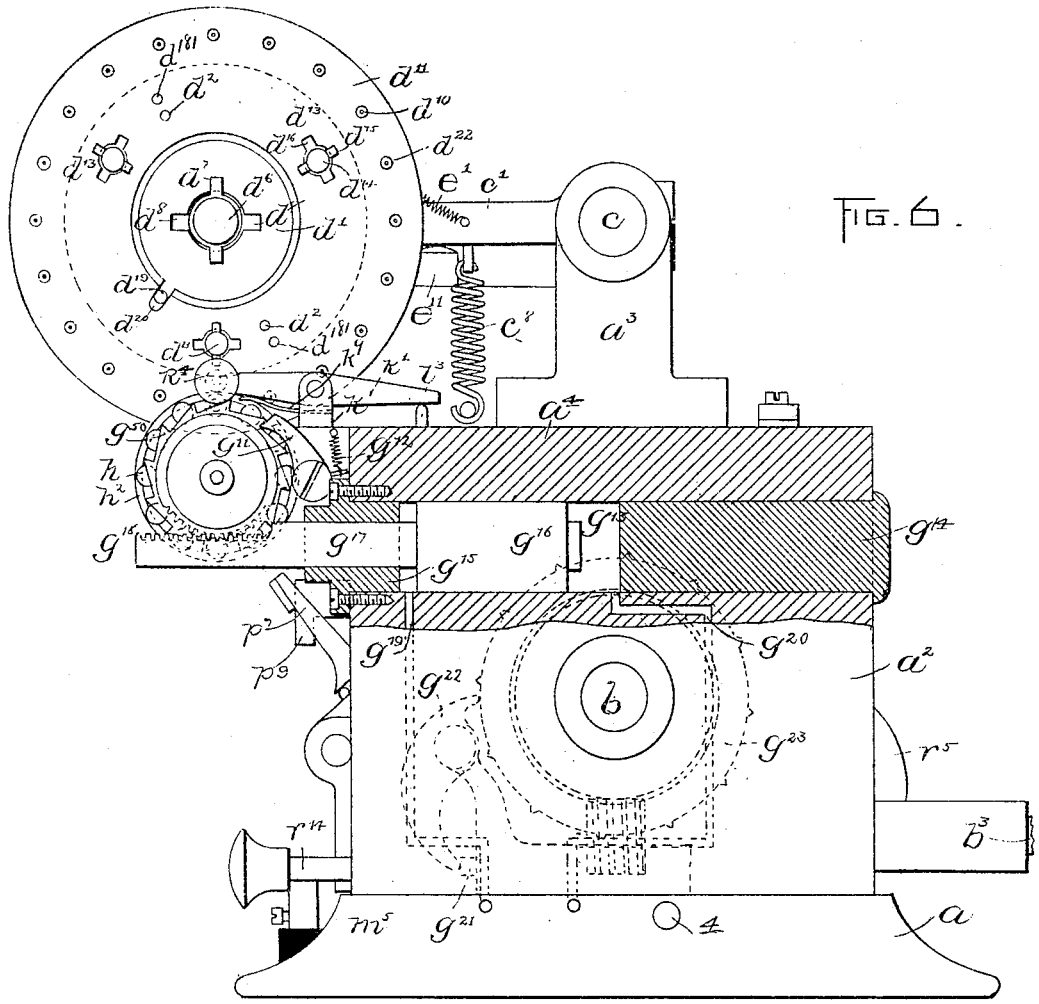
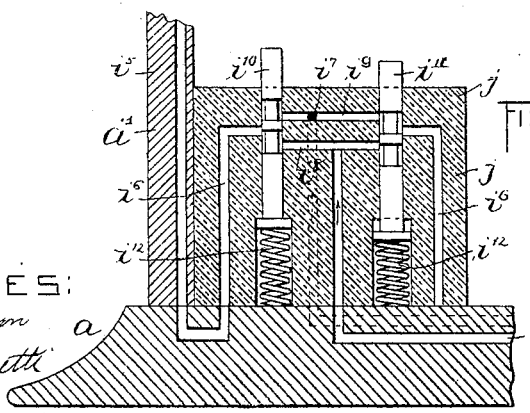
WITNESSES:
INVENTOR:
Duane H. Church

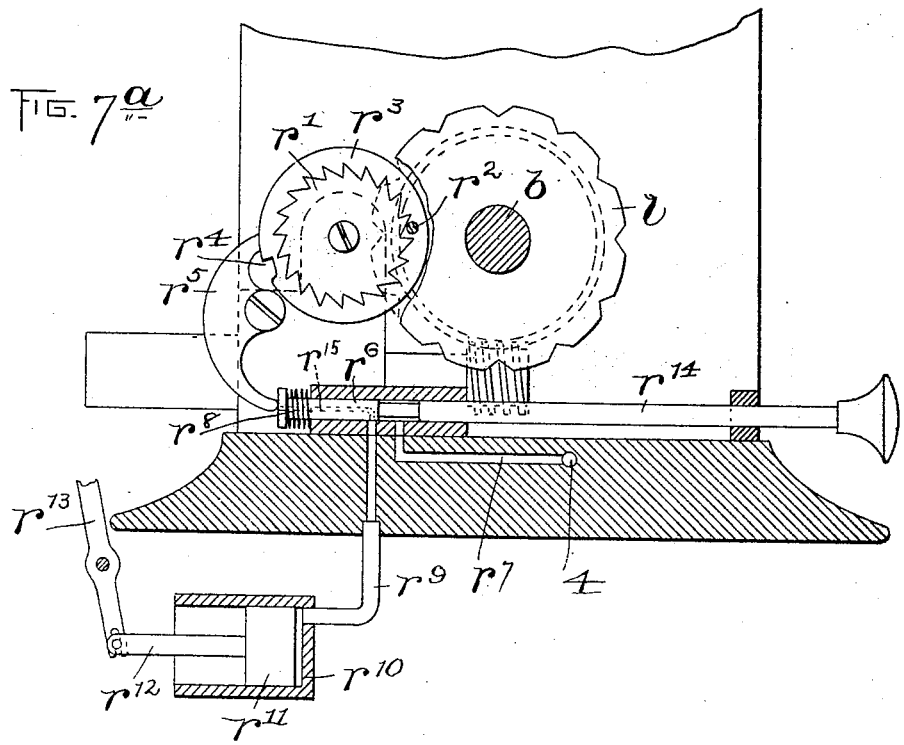
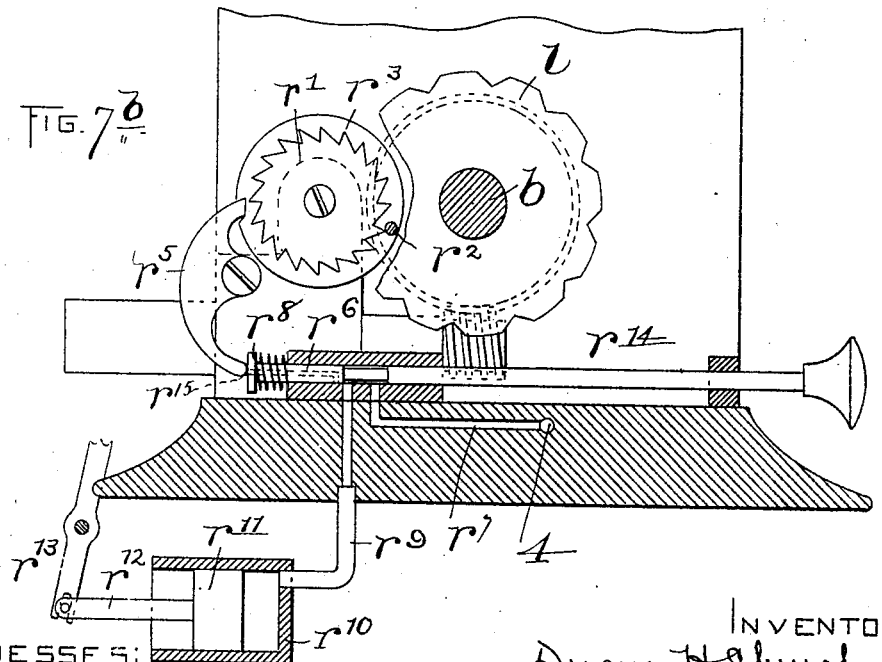

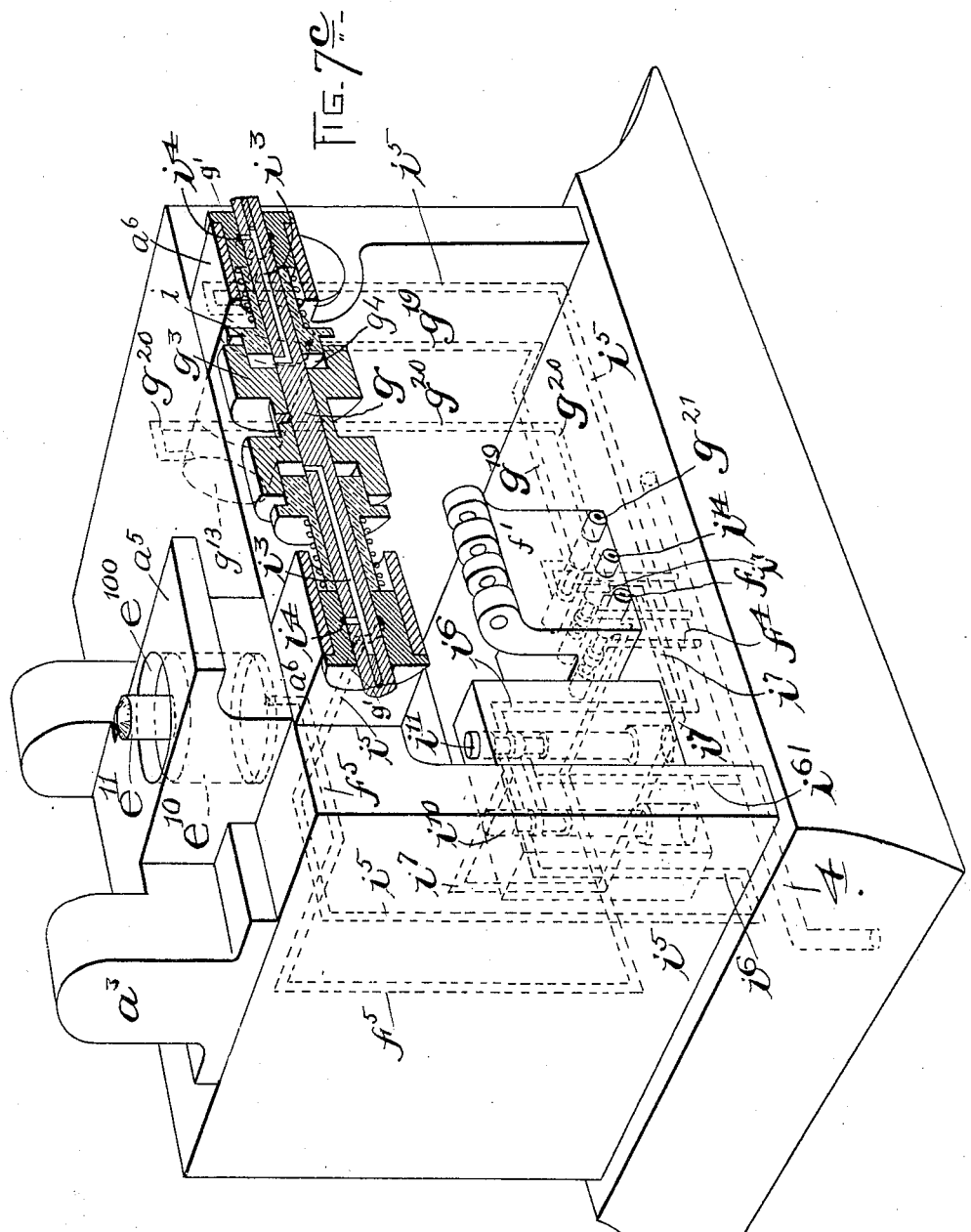

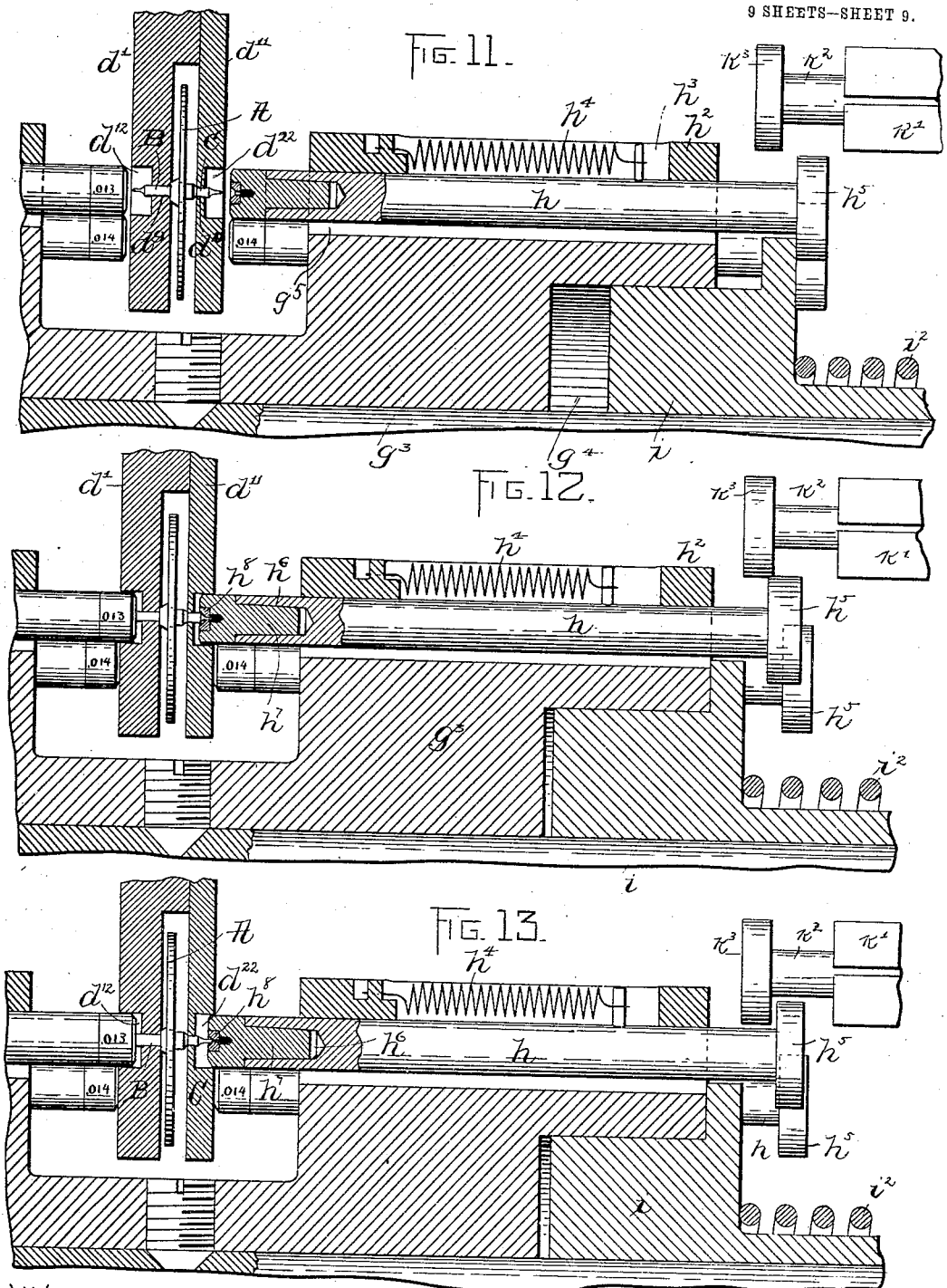

UNITED STATES PATENT OFFICE.

DUANE H. CHURCH, OF NEWTON, MASSACHUSETTS; HARRIET L. CHURCH EXECUTRIX OF SAID DUANE H. CHURCH, DECEASED.

MACHINE FOR GAGING PIVOTS.

No. 809,248.      Specification of Letters Patent.      Patented Jan. 2, 1906.

Application filed May 5, 1898. Serial No. 679,776.

*To all whom it may concern:*

Be it known that I, DUANE H. CHURCH, of Newton, in the county of Middlesex and State of Massachusetts, have invented certain new and useful Improvements in Machines for Gaging Pivots, of which the following is a specification.

This invention has for its object the provision of a machine for automatically gaging the pivots of balance-wheels or other rotating or oscillating parts of a watch and automatically recording the thickness or diameter of each. By reason of the minuteness of the pivots of such parts of a watch as those mentioned it is practically impossible at the present time and with the machines now known to turn and polish them equally or to the same extent, so that they shall be exact duplicates or facsimiles of each other; but inasmuch as they must be fitted with great exactness in the jewels in which they are journaled it is necessary to ascertain the precise diameter of each pivot, whereby a jewel having an aperture of corresponding size may be selected to receive it.

Heretofore it has been the practice to gage each pivot manually by the aid of calipers or other measuring device and then note upon a slip of paper or in some other way its diameter and thickness; but on account of the smallness of the parts and of the fact that the pivots are gaged to the fraction of one-thousandth part of a centimeter thin has been a laborious and difficult operation, requiring the expenditure of a great deal of time and not always proving to be accurate. Moreover, inasmuch as the pivots are rarely ever exactly cylindrical it has been the practice to take the measurement of the greatest cross-diameter of each pivot, and consequently it is difficult to select a jewel having the proper aperture to receive it, since the apertures in the jewels likewise vary. The operation of gaging the pivot by calipers or other tools having jaws has proved to be a source of injury to the pivots, as the pressure of the jaws flattens them and destroys to a greater or less extent their symmetry.

By the present invention the pivots are gaged automatically and their diameters are recorded, whereby the operation is accomplished expeditiously and accurately without the employment of special skilled labor, since the operator is required merely to place the wheels or parts carrying the pivots in a carrier which automatically presents them to the proper gaging devices. The gaging or measuring is accomplished with the aid of a series of gages, each having an aperture smaller than the preceding one by a fraction of one-thousandth part of a centimeter, the gages being brought successively into operative relation to the pivot until one is found that has an aperture exactly equal in diameter to the pivot. In this way there is no danger of flattening the pivot and injuring it.

Before proceeding to a minute and detailed description of the invention I may briefly state that the machine illustrated upon the drawings as embodying it comprises a movable carrier into which the parts having the pivots are placed, a series of gaging devices such as just described, mechanism for bringing each gage into operative relation to the pivot, and devices for recording the diameter of the aperture in the gage which corresponds to the pivot.

The carrier is provided for the reception of a number of pivots, and they are presented one by one to the gages, which are successively brought into engagement with each pivot until a gage is found which corresponds to the diameter of the pivot, whereupon the diameter of the pivot is immediately recorded upon a record-sheet.

The gages are all mounted upon a rotatable carrier, and as soon as the diameter of the pivot is ascertained the next succeeding gages are all held in an inoperative position until a new pivot is presented to them. By reason of there being two pivots for each wheel or oscillating part there are two sets of gages, and the recording devices are arranged to record the diameters of each two pivots side by side upon the record-sheet.

Reference is to be had to the accompanying drawings, and to the letters and figures marked thereon, forming a part of this specification, the same characters designating the same parts or features, as the case may be, wherever they occur.

Figure 2:
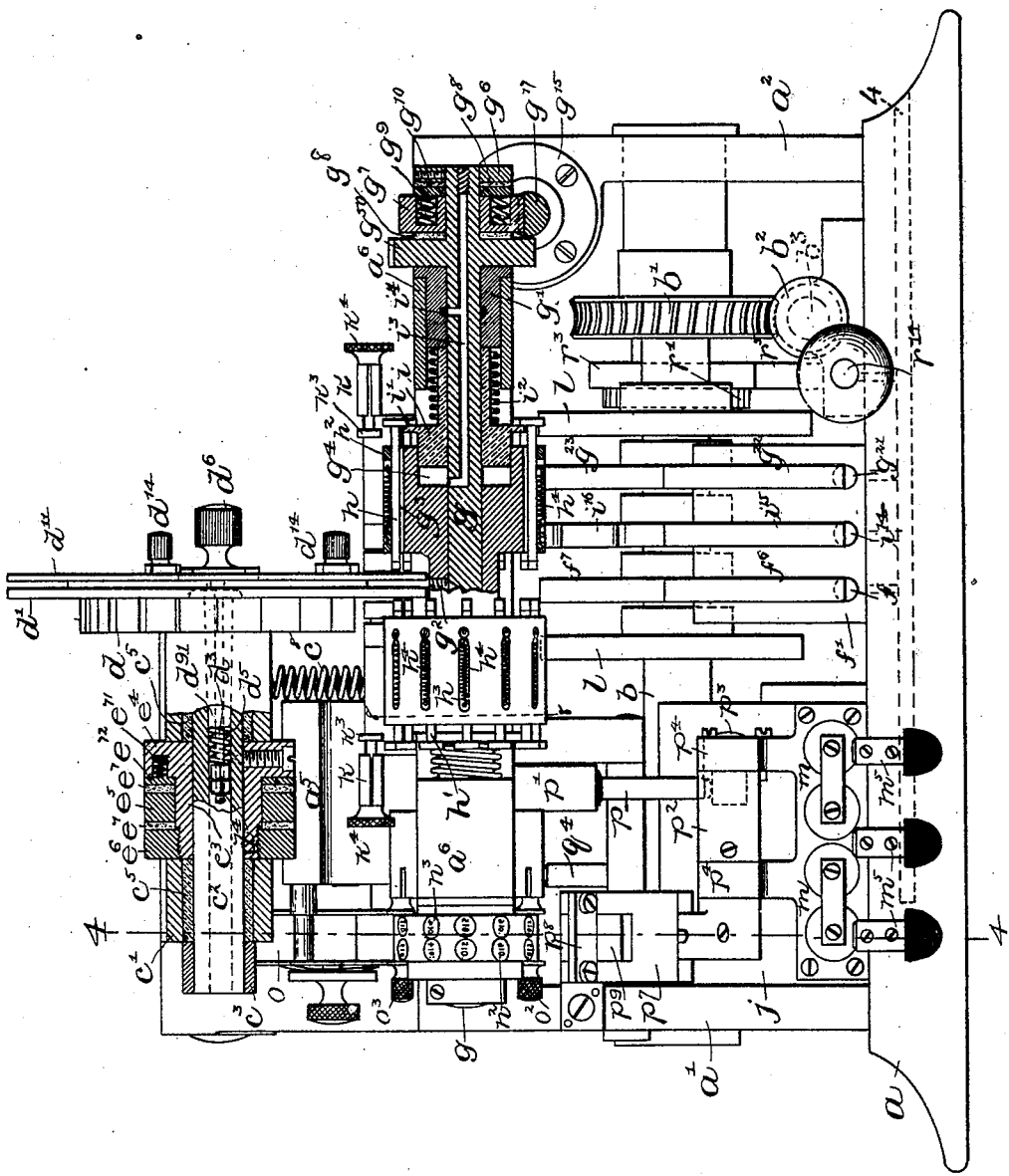
Figure 3:
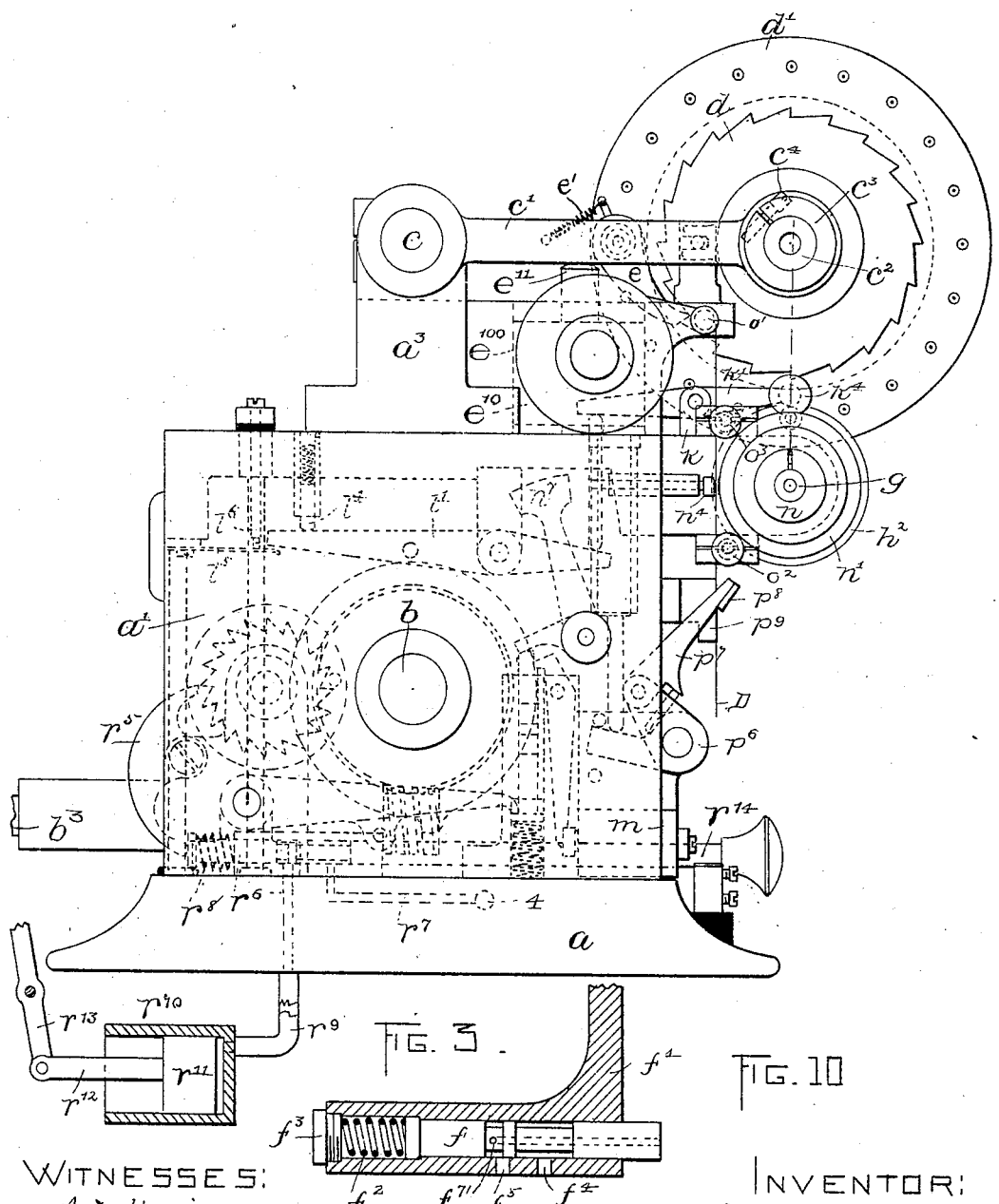
Figure 4:
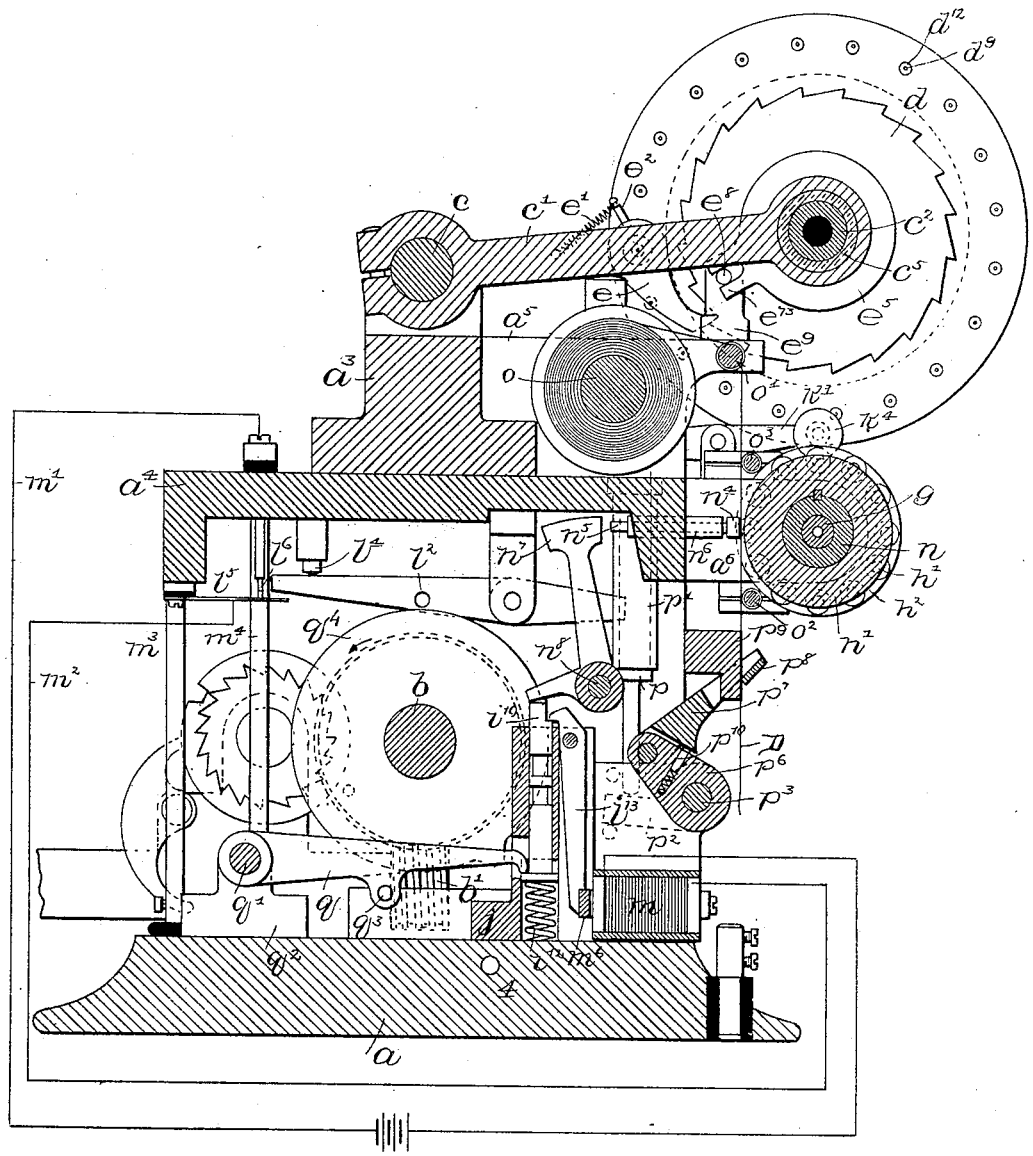
Figure 5:
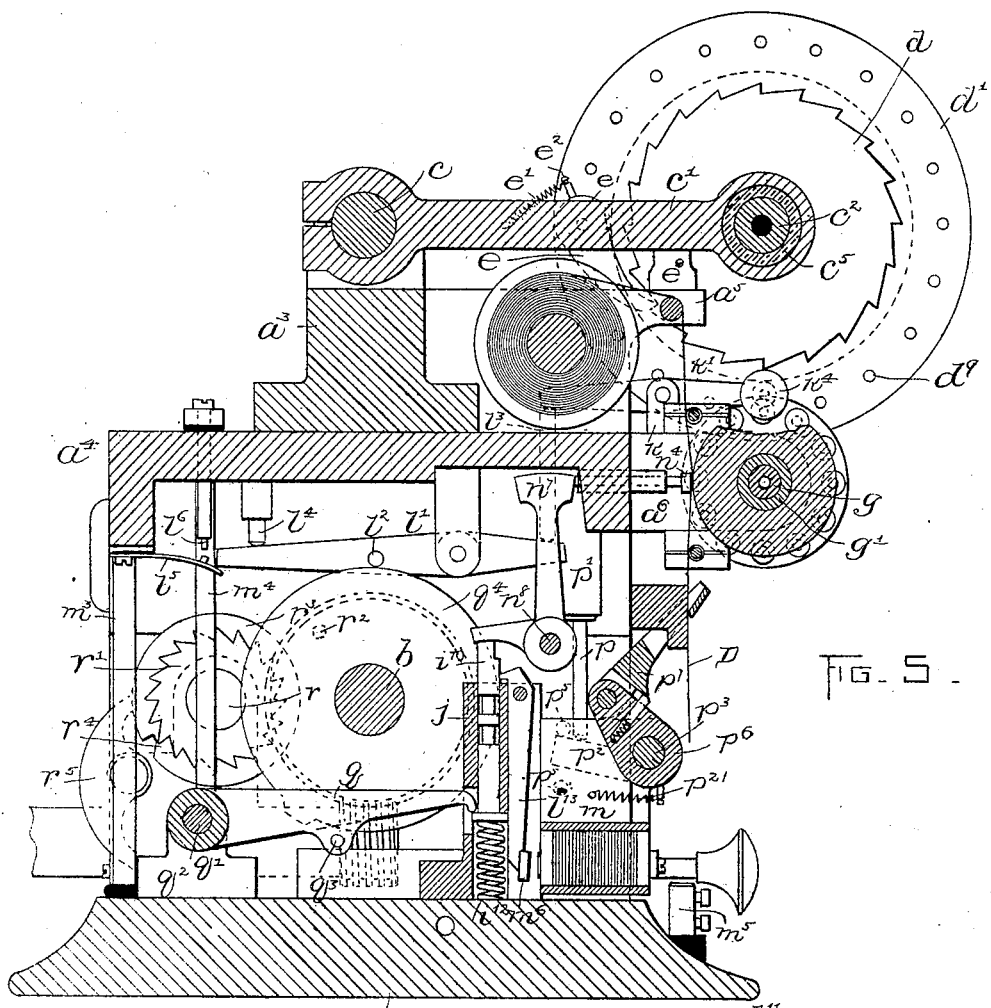
Figures 8, 9:
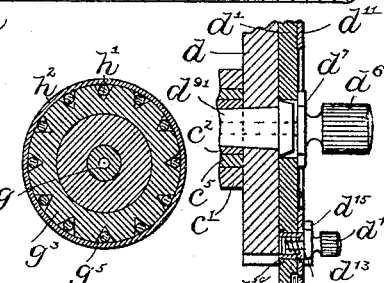

Of the drawings, Figure 1 represents in plan view a machine embodying the invention. Fig. 2 represents a front elevation, partially in section, of the same. Fig. 3 represents an end elevation of the machine. Fig. 4 represents a section on the line 4 4 of Fig. 2. Fig. 5 represents a similar section with the parts in a different position. Fig. 6 represents in elevation the opposite end of the machine. Fig. 7 represents the valves which control the passage of compressed air to the gage-spindle-operating devices. Figs. 7$^a$ and 7$^b$ represent sectional views illustrating the mechanism for automatically stopping the machine. Fig. 7$^c$ represents a partially-sectional perspective view and shows more or less conventionally the air-ducts. Fig. 8 represents a transverse section through the gage-spindle holder or carrier on line 8 8 of Fig. 2. Fig. 9 represents in section a portion of the work-carrier. Fig. 10 represents the valve which initially controls the entrance of air to the gage-spindle-controlling devices. Figs. 11, 12, and 13 represent the gages and gage-spindles magnified about four times.

Referring to the drawings, which illustrate one embodiment of the invention selected by me as being best adapted to accomplish the gaging of the pivots, $a$ indicates the base-plate, and $a'$ $a^2$ indicate the end standards supported thereon. A shaft $b$ is journaled in bearings in the said end standards and is provided with a series of cams, to be hereinafter described, which govern the operation of the various parts of the machine. This shaft is provided with a worm-wheel $b'$, to which power is applied through a worm $b^2$ from the main driving-shaft $b^3$, mounted in bearings upon the base-plate $a$. The shaft $b^3$ is driven from a counter-shaft by a belt or by any other suitable means, there being, if desired, clutch devices operatable through the action of one of the parts of the machine for stopping the rotation of the shaft when one cycle of operations has been completed.

Mounted in a bearing-bracket $a^3$, arising from a top plate $a^4$, supported by the end standards $a'$ $a^2$, is a shaft $c$, upon which is fulcrumed a flat plate or arm $c'$, constituting a movable support for a carrier to be subsequently described. The outer free end of the arm is bifurcated, Fig. 1, and is constructed to receive a transverse hollow shaft or arbor $c^2$, rotatably supported in bushings $c^5$ therein, Fig. 4. At one end the shaft projects beyond the arm to receive a split collar $c^3$, Figs. 2 and 3, having its ends connected by a screw $c^4$, so as to hold the shaft $c^2$ against axial or endwise movement. On the other end of the shaft is formed a ratchet-wheel $d$.

A carrier for the wheels or parts A, having the pivots to be gaged, is attached to the outer face of the ratchet-wheel $d$, said carrier consisting of a disk $d'$ and a coacting ring $d^{11}$, having apertures to receive dowel-pins $d^2$, projecting axially from the wheel $d$, and said ring being held against the face of the disk by a locking device, such as shown in Figs. 6 and 9. This locking device consists of a pin $d^3$, Fig. 2, passing through a conical sleeve $d^{91}$, driven tightly into a tapering aperture in the shaft $c^2$, said pin having on its threaded end a nut $d^4$, between which and the end of the sleeve a coiled spring $d^5$ is placed. On the end of the pin is secured a milled head $d^6$, provided with a radially-extended locking-bar $d^7$, Figs. 6 and 9. The disk $d'$ is provided with a central aperture and slots $d^8$ to receive the cross-bar $d^7$ when the latter is in position to pass through it, but when the milled head $d^6$ is turned the bar $d^7$ is thrown out of alinement with the notches $d^8$ and holds the carrier-disk $d'$ against the ratchet with a spring-pressure.

Thus it will be seen that the carrier-disk may be removed from the shaft $c^2$ or placed thereon, as desired. The disk is cut away on its face near its outer edge, so as to leave a space between it and the ring $d^{11}$ for the reception of the wheels or parts A. The disk and ring have alined apertures $d^9$ $d^{10}$, there being a socket $d^{12}$ surrounding each aperture on the rear face of the disk and a corresponding socket $d^{22}$ in the outer face of the ring, as best shown in Figs. 11, 12, and 13.

The ring $d^{11}$ is removably secured to the disk by a series of locking devices $d^{13}$, Figs. 6 and 9, each device consisting of a milled head $d^{14}$, having a cross-bar $d^{15}$, adapted to be set at an angle to the slots $d^{16}$ in the ring. Connected to the milled head $d^{14}$ is a pin $d^{17}$, having a flange on its end and passed through the end of a thimble $d^{18}$ in the disk $d'$, there being a spring placed between the flanged end of the pin $d^{17}$ and the thimble, so that the cross-bar $d^{15}$ is held against the ring with a yielding pressure. The disk is provided with tapering dowel or steady pins $d^{181}$ to project into apertures in the ring $d^{11}$, there being an additional pin $d^{19}$ lying in a slot $d^{20}$ in the ring, so as to determine their relative positions. The pins $d^{181}$ are preferably tapered, so that when the disk $d'$ and ring $d^{11}$ are assembled prior to being fitted to the wheel $d$ the said disk and ring may be brought together, so that the apertures which are provided for the pins $d^2$, projecting from the wheel $d$, will be in alinement. In other words, the disk $d'$ and ring $d^{11}$ are first assembled and are then fitted to the wheel $d$. If the disk $d'$ and ring $d^{11}$ were not properly assembled, it would be difficult to finally locate them with the pins $d^2$ of the wheel $d$ engaging the apertures that are formed in the disk $d'$ and ring $d^{11}$ for said pins $d^2$.

To place the work in the carrier, the latter is removed and the disk is detached. Then the wheels A or other parts carrying the studs are placed in position, there being twenty apertures in the disk and in the ring for the reception of twenty wheels A. The pivots B are inserted in the apertures in the disk and their ends project into the sockets $d^{12}$ therein, the pivots C projecting through the apertures in the ring into the sockets $d^{22}$ therein, so that they are both exposed and in position to receive the gages.

In order to impart a step-by-step movement to the work-carrier, so as to present each pair of pivots B C to the action of the gages, I employ the following devices.

A pawl $e$, Figs. 3, 4, and 5, is pivoted upon one side of the carrier-support $c'$ and is held in engagement with the ratchet-wheel $d$ by a coiled spring $e'$, having one end attached to the support $c'$ and the other secured to a pin $e^2$, projecting out from the hub of the pawl. Rigidly secured to the shaft $c^2$ between the forked ends of the support $c'$ is a sleeve $e^3$, Fig. 2, threaded at one end and having a flange $e^4$ at the other end. A collar $e^5$ is placed loosely on the sleeve $e^3$ between the flange $e^4$ and a nut $e^6$, screwed on the threaded end thereof, and in order to connect the collar frictionally to the sleeve friction-rings $e^7$, of rubber or other suitable material, are interposed between it and the flange and nut. To increase the friction, springs $e^{71}$ are arranged in sockets in the sleeve and bear against a ring $e^{72}$ between them and the friction-ring $e^7$. The collar $e^5$ has two radially-projecting fingers $e^{73}$, Fig. 4, which straddle a stud $e^8$, extending laterally from a post $e^9$, supported upon a forwardly-projecting extension or block $a^5$ of the bracket $a^3$. Hence when the nut $e^6$ has been adjusted to bind the collar $e^5$ "friction-tight" to the sleeve $e^3$ and shaft $e^2$ the upward movement of the support $c'$ on its fulcrum $c$ will cause the shaft $c^2$ to turn in its bearings, as the collar is prevented from rotating, and the pawl $e$ to slide over a tooth in the ratchet-wheel. Then when the support is allowed to drop the pawl engaging a tooth of the ratchet prevents the shaft and the carrier from turning in a retrograde direction, and consequently the carrier returns to position, having been advanced one step. In its return movement the collar $e^5$ turns upon the sleeve $e^3$, so that when the support is again raised and lowered the same operation will be performed.

The support is raised and lowered by a pneumatic device consisting of a piston $e^{10}$ (shown in dotted lines in Figs. 3 and 7$^c$) in a vertical cylindrical aperture $e^{100}$ in the block or extension $a^5$. The piston has a rod $e^{11}$, extending upward into contact with the under side of the arm or support $c'$, so that when air is admitted to the cylinder below the piston the latter is raised, carrying with it the carrier-support; but when the air is cut off the weight of the piston and the carrier, aided by a spring $c^8$, causes them to drop back into normal position. Compressed air is admitted to the cylinder from a main through a valve, the movement of which is automatically controlled, air passing into the machine through a duct 4. (Shown in Figs. 6 and 7$^c$.) The valve is indicated at $f$ in Figs. 2 and 10 and is mounted in a valve-casing $f'$, supported upon the base of the machine. A spring $f^2$, abutting against the end of the valve and against a threaded plug $f^3$, normally holds the valve forward, so that communication between the main inlet $f^4$ and the duct $f^5$, which leads to the cylinder, is cut off, and consequently to shift the valve in the opposite direction to permit the passage of air into the last-mentioned duct a curved lever $f^6$, Fig. 2, is fulcrumed in an upward extension of the casing $f'$ and has one end resting against the projecting end of the valve and the other end resting against a cam $f^7$ on the shaft $b$. There is but one rise upon the cam, so that during each rotation thereof the lever $f^6$ is swung about its fulcrum to press back the valve $f$ for the purpose of admitting air to the cylinder and raising the piston $e^{10}$ and the support $c'$. There is an exhaust-port $f^{71}$, which extends through the valve, as shown in Fig. 10, which permits the air from the cylinder to be discharged after the valve is returned to normal position by the spring $f^2$.

I shall now proceed to describe the gages and mechanism for bringing them successively into operative relation to the pivots B and C for the purpose hereinbefore referred to.

Journaled in bushings $g'$ $g'$ in the arms $a^6$ $a^6$, which project forwardly from the top plate $a^4$ of the machine, is a shaft $g$, as shown in Figs. 2 and 7$^c$. Midway between its ends is rigidly secured, by means of a screw $g^2$, the gage-carrier, consisting of a sleeve $g^3$, having enlarged ends which are hollowed out to form cylinders $g^4$ for the purpose which I shall subsequently set forth. Each end of the carrier or sleeve $g^3$ is formed with a series of axially-arranged V-shaped grooves $g^5$, in which are placed longitudinally-movable gage-spindles $h$ $h'$, the spindles $h$ being mounted in one end of the carrier and those at $h'$ being mounted in the other end thereof. Each set of gage-spindles is held movably in the carrier by a sleeve $h^2$ forced thereon, and each of the sleeves is slotted, as at $h^3$, Fig. 11, so that each of the slots registers with a spindle. A spring $h^4$ is placed in each slot, and one end thereof is connected to a spindle and the other end is connected to the sleeve. The spindles consist of slender cylindrical pins, each having an enlarged head $h^5$, Figs 11, 12, and 13, and in its inner end a tapering socket $h^6$ to receive a holder $h^7$, in which a jewel $h^8$ or other gage or measuring device is placed. Each jewel has a minute cylindrical aperture which is greater than the aperture in the preceding jewel by a minute fraction of a centimeter—that is to say, the last gage of each set or series may have an aperture of eleven one-thousandths (.011) of a centimeter in diameter and the first one eighteen one-thousandths, (.018,) and as there are twelve gages in each set the aperture of each intermediate gage will be one-twelfth of seven one-thousandths (.007) of a centimeter greater than the preceding one. For convenience I have termed the jewels and their holders "gages;"

but it will be understood that these parts may be constructed in any suitable or convenient way.

The end of each gage has an external diameter small enough to permit it to enter any one of the sockets $d^{12}$ or $d^{22}$ in the work-carrier, and the gage-carrier is in such relation to the work-carrier that two gages (one of each set) are in alinement with each other and with the pivots on one of the parts A. The gages are held normally away from the carrier, and when they are released their springs $h^4$ draw them forward yieldingly, so that the gages which are in operative position would be drawn into engagement with the pivots B C of a wheel or part A, as shown in Figs. 12 and 13.

In order to rotate the gage-carrier, the shaft $g$ is formed or provided with a ratchet-wheel $g^{50}$, and between the latter and a collar $g^6$, rigidly secured upon the end of the shaft, is placed loosely a partial pinion $g^7$, there being friction disks or rings $g^8$ $g^8$ between this pinion and the ratchet-wheel and collar $g^6$, whereby it is frictionally engaged with the shaft $g$. In order to increase the friction, springs $g^9$ are placed in longitudinally-arranged sockets in the pinion $g^7$ and bear against a disk $g^{10}$ between the pinion $g^7$ and one of the friction-rings $g^8$.

The pawl $g^{11}$ is pivoted upon the plate $a^4$ and is held by a spring $g^{12}$ in engagement with the ratchet $g^5$, as shown in Fig. 6. The end wall $a^2$ of the machine is thickened at its upper end to provide a cylinder $g^{13}$, Fig. 6, one end of which is closed by an elongated plug $g^{14}$ and the other end of which is closed by an apertured plug $g^{15}$. The piston $g^{16}$ is provided with a forwardly-projecting piston-rod $g^{17}$, having rack-teeth $g^{18}$ meshing with the teeth of the pinion $g^7$. The piston is normally in its forward position, as shown in Fig. 6, and hence when it is moved rearwardly by the admission of air in front thereof it rotates the pinion $g^7$, which by its frictional engagement with the shaft $g$ turns the latter a part of a rotation, and when the piston $g^{16}$ is again moved forwardly the pinion $g^7$ turns upon the shaft $g$ after it has brought one tooth of the ratchet firmly against the pawl $g^{11}$. Compressed air is admitted to the cylinder $g^{13}$ through ducts $g^{19}$ $g^{20}$, leading to the valve-casing $f'$ from the main duct 4, and the passage of air into the said ducts is controlled by a valve $g^{21}$, Figs. 2 and $7^c$, in said casing similar in construction to the valve $f$. A lever $g^{22}$, similar to that at $f^6$ and shown in dotted lines in Fig. 6, is fulcrumed in upwardly-projecting arms and has one end pressed against the valve $g^{21}$ and the other end bearing against a cam $g^{23}$ upon the cam-shaft $b$. This cam has twelve rises, and there are twelve teeth to the ratchet-wheel $g^{50}$, so that for each revolution of the shaft $b$ the gage-carrier is actuated twelve times and makes one complete rotation. Consequently, inasmuch as the work-carrier is moved only one step for each rotation of the cam-shaft $b$ and the gage-carrier is given one entire rotation, the gages must be therefore all brought one by one into operative relation to each pivot B and C.

As has been previously stated, the gages are all normally held in inoperative position; but each time the gage-carrier is moved forward one step the gages are released and are allowed to be drawn forward by their springs into operative relation to the pivots. To accomplish this, a hollow piston $i$ is placed loosely on the shaft $g$ in each of the cylinders $q^4$ of the carrier and is provided with a flange $i'$, adapted to engage the heads $h^5$ of the gage-spindles $h$ $h'$, as shown in Figs. 11 to 13, inclusive.

A spiral spring $i^2$ is placed upon the hub of each piston and bears against the bushing $g'$, so that if other means were not interposed the pistons would be held inward against the gage-carrier.

The shaft $g$, however, is bored inward from each end to provide the air-ducts $i^3$, which lead into the cylinder $g^4$, and each air-duct $i^3$ communicates with an annular duct $i^4$ in the bushing $g'$, as shown in Fig. 2. Each of the ducts $i^4$ communicates through a duct $i^5$ (see Figs. 7 and $7^c$) with a duct $i^6$ in a valve-casing $j$. There are two ducts leading into the casing $j$, one, $i^{61}$, leading from the main duct 4, and the other, $i^7$, leading from the valve-casing $f'$, to which air is supplied from the said duct 4.

The ducts $i^{61}$ $i^7$ lead into transverse ducts $i^8$ $i^9$, either of which communicates with the ducts $i^6$ $i^6$, there being two valves $i^{10}$ $i^{11}$, which control the entrance of air from either of said ducts $i^8$ or $i^9$ into the ducts $i^6$. The valves $i^{10}$ $i^{11}$ are adapted to be raised by springs $i^{12}$; but they are held normally depressed by latches $i^{13}$, Fig. 4, arranged side by side and each pivoted in a groove in the valve-casing. The latches are shown in Fig. 4, and they are provided with lips, which engage shoulders on the valve, so as to hold them depressed against the pressure of the springs $i^{12}$, which tend to raise them.

When the valves are depressed, air is adapted to enter from the duct $i^7$ to the ducts $i^6$ $i^6$ through the ducts $i^5$ $i^4$ $i^3$ into the cylinders $q^4$; but when the valves are allowed to rise by the disengagement therewith of the latches $i^{13}$ air is permitted to flow in a steady stream through the duct $i^{61}$ and the duct $i^8$ into the ducts $i^6$, so as to hold the pistons $i$ backward against the force of the spring, whereupon the gages are all held in an inoperative position. Under normal conditions, however, the communication from the duct $i^{61}$ is shut off and air is admitted from the ducts $i^7$ in puffs as needed.

The admission of air into the duct $i^9$, which leads into the valve-casing $f'$, is controlled by a valve $i^{14}$, Fig. 7ᶜ, in the casing $f'$, similar to that shown in Fig. 10, and against the end of the valve a curved lever $i^{15}$ lies, the upper end of the lever resting against a cam $i^{16}$ on the shaft $b$. This cam has twelve rises, which are elongated, comparatively, and are separated by notches.

Now it will be seen that as the cam-shaft $b$ rotates the valve $i^{14}$ will be reciprocated at intervals to permit compressed air to pass through the duct $i^7$ into the ducts $i^5$ and from thence to the cylinders $q^4$, and as the supply is cut off at intervals for a short time the spring $i^2$ is allowed to force the piston $i$ inward intermittingly to permit the gages to move into operative relation to the pivots. Under normal conditions this inward movement of the piston $i$ is permitted immediately after the gage-carrier has been fed forward one step.

The gages are arranged in such order that the aperture in the first jewel is the largest and those in the rest diminish gradually in diameter, and consequently when the gages are thrust into operative relation to the pivots the pivots, if they are smaller than the apertures in the gages, enter therein easily, as shown in Fig. 12, and so long as the pivots are able to enter the apertures they must necessarily be less in cross-diameter than the apertures; but as soon as a jewel is reached in which the aperture is exactly the same diameter as that of the pivot the jewel cannot be slipped onto the pivot, and the inward movement of the gage-spindle is checked, as shown in Fig. 13. Then as the apertures in the gages are all known the diameter of the pivot is readily ascertained.

The two sets of gages are entirely independent of each other so far as the movement of the individual gage-spindles is concerned; but the two sets are revolved with the gage-carrier simultaneously, so that two opposing spindles are moved in unison into operative position with relation to the work.

As soon as the gage having the aperture corresponding to the aperture of the stud is found a record is made by devices which I shall now describe.

Fulcrumed in lugs $k$, Figs. 1 and 6, extending upward from the plate $a^4$, are two centrally-pivoted independently-movable levers $k'$, each having in its forward projecting end a pin $k^2$, provided at one end with a disk or head $k^3$ and on the other end with an adjusting-nut $k^4$. (See Figs. 1 to 6 and 11 to 13.) Each pin is mounted in the split sleeve at the end of one of the levers $k'$ and is held frictionally against movement in the direction of its length except when adjusted by the nut $k^4$, which is screwed upon the threaded end thereof and bears against the end of the sleeve. The levers and pins $k^2$ are so mounted with respect to the gage-carrier that the disks $k^3$ are immediately over the heads $h^5$ of the two gage-spindles which are in alinement with the studs whose diameters are to be ascertained, as shown in Figs. 2, 6 and 11 to 13, and they are likewise so placed that when the gage-spindles are thrust forward until the studs enter the apertures in the jewels the front ends of the levers $k'$ cannot be depressed, as the disks $k^3$ will engage the said heads $h^5$, as shown in Fig. 12. When, however, a gage has been reached in which the diameter of the jewel is equal to the diameter of the stud and the gage-spindle is prevented from making its complete inward stroke, as shown in Fig. 13, the head $h^5$ thereof is not directly under the disk $k^3$, and consequently the forward end of that lever $k'$ may be depressed to a greater extent.

From this description it is apparent that so long as neither of the levers $k'$ can be depressed a gage having an aperture equal in diameter to either of the pivots being measured has not been reached, but that when one of said levers is free to be depressed or vibrated it indicates that a gage has at last been reached in which the aperture is equal in diameter to the pivot. The vibratory levers $k'$ are independent, since the pivots B C are liable to vary.

For convenience I term each lever $k'$ having the pin and disk a "feeler," which is adapted to be vibrated by means now to be described.

Upon the shaft $b$ are placed two cams $l\ l$, Figs. 2 and 7ᵃ, each having twelve notches or depressions, and fulcrumed in brackets depending from the plate $a^4$ are two levers $l'\ l'$, each having a pin $l^2$ extending over one of the cams $l$. The forward end of each of the levers project under a pin $l^3$, mounted in suitable guides and having its upper end bearing against the under side of the inner end of one of the levers $k'$. A spring-pressed pin $l^4$, Fig. 3, bears against the rear end of each of the levers $l'$, the spring being strong enough to force downward the rear end of the lever $l'$ when the cam $l$ is in proper position so that the pin $l^2$ can move into one of the notches thereof and raise the forward end of the lever to depress the outer end of the lever $k'$ against the pressure of its spring $k^9$, (this last-mentioned spring being shown in Fig. 6,) provided that the front end of the said lever $k'$ does not engage a gage-spindle.

A leaf-spring $l^5$, Fig. 4, secured to the plate $a^4$, but insulated therefrom, projects under the rear end of each of the levers $l'$ and is held thereby normally away from the contact $l^6$. Each spring $l^5$ and contact $l^6$ is in circuit with an electromagnet $m$ by wires $m'\ m^2$, as illustrated conventionally in Fig. 4. In practice the wires will pass through insulated tubes $m^3\ m^4$ and thence under the base of the machine and will be connected to binding-posts $m^5$. (Shown in Fig. 2.) The armature $m^6$ of each electromagnet is connected to one of the latches $i^{13}$, and hence so long as the spring $l^5$ remains in contact with the contact $l^6$ the circuit is closed through each magnet and the two latches $i^{13}$ are held in engagement with their respective valves $i^{10}$ $i^{11}$; but when a gage has been brought into operative relation to one of the pivots and has been found to have an aperture of the diameter equal thereto, whereupon the forward end of the feeler can be depressed, (the cam $l$ being in position whereby one of its depressions register with the pin $l^2$,) the spring-pressed pin $l^4$ forces downward the rear end of the lever and also forces the spring $l^5$ away from the contact $l^6$ to break the circuit through one of the magnets $m$, whereupon the armature $m^6$ is released and the spring $i^{12}$ forces the valve $i^{10}$ upward to close the duct $i^7$ and open communication between the duct $i^{61}$ and the duct $i^5$, which leads to the cylinder on that side of the carrier on which the depressed feeler is located, and from that time until the gage-carrier completes one revolution its gages $h'$ are held in inoperative position by air being steadily admitted through the duct $i^{61}$ to the cylinder $g^4$ on the left side of the carrier.

The two feelers are independent of each other, as stated, and the pneumatic devices for operating the gage-spindles are likewise independent, so that although the gages on one side of the carrier may be held in an inoperative position the gages on the other end may be operated until the diameter of the pivot or work-carrier on that side has been ascertained.

Secured upon the end of the shaft $g$, Fig. 4, is a bushing $n$, to which is keyed a ring $n'$, having on its periphery types or stencils bearing numerals $n^2$ $n^3$, Fig. 2, arranged in two sets and placed side by side, the said numerals indicating the diameters of the gages.

Two platens $n^4$ (one of which is shown in Figs. 3, 4, and 5) are mounted upon the ends of pins $n^5$, longitudinally movable in guides $n^6$ and normally held at a slight distance away from the numeral-bearing ring, as shown in Fig. 4, by the paper strip D, hereinafter described. Said paper strip in the operation of the machine is always under sufficient tension to hold it in the position shown in said figure when pressed against the numeral-bearing ring, as hereinafter described, and they are so arranged that one platen is opposite each set of numerals. The inner ends of the pins $n^5$ project inwardly and are in position to be struck by two hammers $n^7$, fulcrumed upon a shaft $n^8$, held in suitable bearings. The hammers $n^7$ are in the form of bell-crank levers, and their arms rest upon the tops of the valves $i^{10}$ $i^{11}$. (See Fig. 4 in connection with Fig. 7$^c$.) The numeral-bearing ring $n'$ is so mounted upon the shaft $g$ that the numerals which indicate the diameters of the apertures in the gages then in alinement with the pivot in the carrier are registered with the platens $n^4$. Consequently when either one of the feelers is depressed beyond the end of a gage-spindle and the corresponding latch $i^{13}$, Fig. 5, is released the valve which was held down by the latch is forced upward, causing its hammer $n^7$ to strike the pin $n^5$ a sharp blow and force the platen against the numeral on the numeral-bearing ring.

A strip of paper D, Figs. 3, 4, and 5, is drawn from a reel $o$, supported upon the top of the machine, past a stud $o'$ and downward between the platens and the numeral-bearing ring, and an ink-ribbon is wound upon the shafts $o^2$ $o^3$, which are provided with milled heads, as shown in Fig. 2. The ribbon is fed forward at times by hand, but the record-strip D is fed one step each time the work-carrier is actuated.

A piston $p$, Figs. 4 and 5, movable through a cylinder $p'$, depending from the plate $a^4$ and communicating with the cylinder $e^{100}$, Fig. 7$^c$, rests upon an inwardly-projecting arm $p^2$, secured to a shaft $p^3$, journaled in bearings $p^4$ $p^4$, Fig. 2, in the front of the machine and in front of the valve-casing $j$. This arm $p^2$ is movable between stops $p^5$ $p^5$, (shown in Fig. 5,) and it is normally raised when the piston $p$ is lifted by a spring $p^{21}$.

To the end of the shaft $p^3$ is secured another arm $p^6$, to the end of which is pivoted an arm $p^7$, Figs. 3 and 4, having a sharpened transverse edge $p^8$ at its end, held against an abutment $p^9$ by a spring-pressed pin $p^{10}$, arranged in a socket in the arm $p^6$ and bearing against the said arm $p^7$, as shown in Fig. 4. The strip of paper or record-sheet D is passed between the edge $p^8$ and the abutment $p^9$, and hence when the piston $p$ is raised the arms $p^6$ $p^7$ are in the position illustrated in Fig. 5; but when the piston $p$ is forced downward by air being admitted into the cylinders $e^{100}$ $p'$ the knife-edge $p^8$ engages the paper and draws it downward a short distance, as will be readily understood. The tension thus produced on the paper strip causes it to leave or move away from the numeral-bearing ring as soon as the hammer $n^7$ has retreated, the paper carrying with it the pin $n^5$ which had been actuated. The paper-feed devices operate after the record has been made, and the work-carrier is moved forward one step.

After the gage-carrier has made one complete rotation the valves $i^{10}$ $i^{11}$ are returned to their normal positions to provide for the admission of the compressed air to the pneumatic devices which move the gage-spindles. To accomplish this, levers $q$, Figs. 4 and 5, are fulcrumed upon a shaft $q'$, supported in bearing-brackets $q^2$ in the rear of the machine, and their front ends project through apertures in the valve-casing $j$ and rest upon the lower flanged ends of the valve $i^{10}$ $i^{11}$, as shown in Figs. 4 and 5.

One of the levers is provided with a pin $q^3$, with which a cam $q^4$ on the shaft $b$, as clearly shown in Fig. 5, engages once during each revolution thereof. The parts are timed to cause the depression of the levers $q$ immediately before the completion of one cycle of operations of the machine or during the movement of the work-carrier after the record for a pair of pivots has been made.

In order to bring the machine to a stop after all the pairs of pivots in the pivot-carrier have been measured and their diameters recorded, I mount upon a stud-shaft $r$ in the rear of the machine a ratchet or toothed wheel $r'$, Figs. 5, 7$^a$, and 7$^b$, to which a step-by-step movement is imparted by the engagement therewith of a pin $r^2$ on the cam $l$, which is at the right end of the machine. A disk $r^3$, having a single notch $r^4$, is formed on or secured to the ratchet or toothed wheel, and against it bears a centrally-fulcrumed curved lever $r^5$, whose lower end presses against a valve $r^6$. (Shown in Figs. 7$^a$ and 7$^b$ and in dotted lines in Fig. 3.)

The valve slides in a valve-casing to which air is admitted from the main duct 4 by a duct $r^7$ and is normally held against the pressure of a spring $r^8$ to cut off the air-supply from a pipe $r^9$. There are as many teeth to the ratchet $r'$ as there are pairs of pivots in the work-carrier, and when the gaging of the last pair of pivots is completed the disk is moved to bring the notch $r^4$ opposite the end of the lever $r^5$, whereupon the said end immediately drops into the notch and the spring forces the valve forward to permit air to pass into the duct $r^9$. The said duct leads into a cylinder $r^{10}$, in which there is a piston $r^{11}$, having its rod $r^{12}$ connected to a lever $r^{13}$. This last-mentioned lever is connected to clutch and brake mechanism, (not shown,) which controls the movement of the initial power-shaft $b^3$, and consequently when air is admitted to the cylinder $r^{10}$ the power is shut off from the said shaft and the brake mechanism immediately prevents further movement of the same.

To start the machine again, the rod $r^{14}$ of the valve $r^6$ is operated by means of its knob, (see Figs. 7$^a$ and 7$^b$,) so that the valve is moved forward to cut off air from the pipe $r^9$, which supplies air to the cylinder $r^{10}$. The valve-rod is formed with a small port $r^{15}$, (see dotted lines in Figs. 7$^a$ and 7$^b$,) and the inner end of said port $r^{15}$ registers with the port leading to the pipe $r^9$ when the valve-rod is shifted to cut off the supply of air from the duct $r^7$. Said port $r^{15}$ serves as a vent, so that the air in cylinder $r^{10}$ may exhaust to the atmosphere to permit the lever $r^{13}$ to be operated, so that power may be again supplied to the power-shaft $b^3$.

The operation of the machine may be briefly described as follows:

The operator having filled the pivot or work-carrier with balance-staffs secures it upon the ratchet $d$ by the spring-clamps $d^7$ and then draws out the rod $r^{14}$ to start the machine. When the rod is fully drawn out, air is cut off from the cylinder $r^{10}$ to permit the clutch mechanism (not shown) to be operated and cause the rotation of the main power-shaft $b$ through the shaft $b^3$.

As the shaft commences its rotation the valve $i^{14}$ is operated by the lever $i^{15}$ and the cam $i^{16}$ to cut off the air from the cylinders $g^4$, formed by the sleeves $g$, and permit the springs $i^2$ to force the pistons $i$ toward each other, and thereby allow the springs $h^4$ to draw the gages $h$ into operative position with relation to each of the two pivots on the staff being measured and into engagement with the said pivots. The first pair of gages have the largest apertures in their ends, and if the pivots are smaller than the apertures they enter therein. Immediately while the gages are in that position the feelers are operated by the levers $l'$ and the disks $k^4$ pass freely by the heads of the gages and prevent the circuit being broken between the contacts $l^5$ $l^6$, as seen in Fig. 5, and the operation of the recording mechanism. Again, as the shaft $b$ continues to rotate air is admitted first to the rear end of the cylinder $g^{13}$ and then to the front end thereof by means of the cam $g^{23}$, the lever $g^{22}$, and the valve $g^{21}$ to advance the gage-carrier one step to bring two new gages a size smaller into alinement with the pivots. These gages are brought into operative relation with the pivots, and if the apertures therein are adequate to receive the ends of the pivots the recording mechanism is again prevented from being actuated.

Let it be assumed, however, that when the next pair of gages is brought into operative relation to the pivots the apertures in the jewels carried thereby will not permit the pivots to enter therein. Then when they are engaged with the latter and the feelers are operated the disks $k^3$ move downward past the edge of the gages and permit contact to be made between the spring $l^5$ and the contact $l^6$. This breaks the circuit through the magnet $m$ and causes the release of the plungers $i^{10}$ in the manner hereinbefore described.

The springs $i^{12}$ raise the plungers $i^{10}$ and cause the hammers $n^7$ to engage the plungers $n^5$, which carry the platens $n^4$. The platens force the tally-sheet against the numerals on the gage-carriers, and the diameters of the pivots, which are then in engagement with the gages, are automatically recorded upon the said sheet. At the same time air is permitted to enter from the open ducts $i^{61}$ $i^8$ into the ducts $i^6$, so as to hold the pistons $i$ backward, whereby all the gages are held in inoperative position during the remainder of the rotation of the gage-carrier.

As the shaft $b$ completes one rotation the valve $f$ is operated by the cam $f^7$ and lever $f^6$ to admit air to the cylinder $e^{100}$ and also the cylinder $p'$. The piston $p$ is forced downward to swing the arm $p^2$ and actuate the arm $a^7$ to feed the record sheet or strip of paper D, and at the same time the piston $e^{10}$ is raised to rotate the ratchet $d$ one step, this being accomplished by its lifting the lever $c'$ until the pawl $e$ engages the next succeeding tooth in the ratchet, whereupon when the said lever $c'$ drops a new staff is presented to the action of the gages. When all of the pivots in the carrier have been gaged and their measurements recorded, the ratchet $r^3$ completes one rotation and the end of the lever $r^5$ drops into the socket $i^4$ and permits the spring $r^8$ to shift the rod $r^{14}$ and admit air to the cylinder $r^{10}$ to shift the clutch mechanism and stop the machine.

It is to be understood that no attempt has been made in the drawings to illustrate all of the details of the various operating-cylinders of the machine, inasmuch as the same are not claimed herein. It is also to be understood that suitable exhausts are provided for permitting air to be exhausted from the cylinders when their pistons are to be returned to their original positions.

It will be understood that while I have illustrated the invention as embodied in a machine for gaging "pivots," yet I do not thereby limit myself to the use of the machine for the measurement of those particular parts, and hence wherever in the specification and claims I use the word "pivot" I employ it as designatory of any part or feature to be measured. The gages vary in character with the thing to be measured, and instead of grading them from large to small they may be equally well graded from small to large.

The work carrier or holder is referred to in some of the claims as having relatively movable members. In the embodiment of the invention illustrated in the accompanying drawings said members comprise the disk $d'$ and the ring $d^{11}$, between which the work is held. As hereinbefore described, the ring $d^{11}$ is movable relatively to the disk $d'$ for the purpose of inserting and removing the work. It is to be understood, however, that my invention is not limited to the specific form of relatively movable members illustrated.

Having thus explained the nature of the invention and described a way of constructing and using the same, though without attempting to set forth all of the forms in which it may be made or all of the modes of its use, I declare that what I claim is—

1. A machine of the character described comprising a holder having relatively movable members for holding a pivot against displacement, a plurality of gages each having an aperture differing in its known diameter from that of the others, and mechanism for automatically bringing said pivot and said gages into operative relation while said pivot is held or carried by the holder.

2. A machine of the character described, comprising a holder having clamps, for a pivot, a plurality of gages each having a jewel with an aperture of a known diameter, and automatic mechanism for bringing said pivot and said jewels into operative relation while said pivot is carried by said holder.

3. A machine of the character described comprising a holder having provisions for clamping a pivot therein, a plurality of gages each having a jewel with an aperture of a known diameter, and automatic mechanism for moving said gages in succession into operative relation to said pivot.

4. A machine of the character specified comprising a holder having relatively movable members having provisions for clamping the article being measured, measuring devices, and mechanism for causing said devices to measure the diameter of a part or feature of said article.

5. A machine of the character specified comprising a holder with provisions for clamping or securing the articles being measured, measuring devices, and mechanism for causing said devices to measure and record the diameter of a part or feature of said article.

6. A machine of the character described having a holder for the article to be measured and a plurality of measuring-gages for automatically measuring each of two different parts of said article.

7. A machine of the character described having a holder for the article to be measured and a plurality of measuring-gages for automatically measuring and independently recording the measurements of each of two different parts or features of said article.

8. A machine of the character described comprising a plurality of gages, a holder having relatively movable members independent of the gages for the articles to be measured, means for moving said holder to present said articles to each of said gages, and means for bringing each article and said gages successively into engagement until said article is measured.

9. A machine comprising a plurality of gages, a holder having relatively movable members independent of the gages for a plurality of articles to be measured, means for automatically moving said holder, and mechanism for automatically causing the pivot and gage to engage without dislocating said article from its holder.

10. A machine comprising a holder having relatively movable members for receiving and holding a pivot or thing to be measured, a plurality of graded gages, mechanism for advancing said gages automatically into operative relation to a pivot in the holder, and mechanism for causing said gages to measure said pivot without removing it from said holder.

11. A machine comprising a rotary holder having relatively movable members for receiving a pivot or thing to be measured, a carrier having a plurality of graded gages, mechanism for imparting a step-by-step movement to said holder to present the pivots or things to be measured successively to the gages, and mechanism for causing said gages to measure said pivot without removing it from said holder.

12. A machine for measuring the pivot on the end of a balance-staff, comprising a holder having provisions for receiving and rigidly holding said staff, a plurality of independent measuring devices for measuring the cross-diameter of the said pivot, and automatic mechanism for causing said holder to present said pivot to said measuring mechanism.

13. A machine having a holder having relatively movable members for receiving and rigidly holding a thing to be measured, a plurality of gages for measuring said thing, and means for causing said thing and said gages to be brought into operative relation.

14. A machine comprising a series of gages, a holder having relatively movable members for receiving and rigidly holding an article to be measured, mechanism for causing the article to be brought into operative relation to the gages until a gage corresponding to the article is reached.

15. A machine of the character described comprising a holder having relatively movable members for clamping an article to be measured, and a series of gages each movable into operative relation to said article.

16. A machine of the character described comprising a pivot-holder having provisions for clamping an article to be measured, a gage-carrier having a series of gages, and mechanism for moving said carrier to bring said gages successively into operative relation to an article.

17. A machine of the character described comprising a holder having relatively movable members for an article to be measured, a rotary carrier having a series of gages, and mechanism for imparting a step-by-step movement to the carrier to bring the gages successively into operative relation to said article.

18. A machine of the character described comprising a holder for the article to be measured, a carrier having a series of movable gages, mechanism for moving the carrier to bring the gages successively into alinement with said article, and mechanism for bringing the gages into contact with said article.

19. A machine of the character described comprising a holder, for the article to be measured, a series of independently-movable gages, mechanism for bringing said gages successively into engagement with said article, and automatic devices for holding the remaining gages out of contact with said article after a gage corresponding to said article has been engaged therewith.

20. A machine of the character described comprising a holder for the article to be measured, a series of movable gages, mechanism for bringing said gages successively into engagement with the said article, a feeler, in operative relation to said gages, and mechanism controlled by said feeler for governing the movement of the gages.

21. A machine of the character described comprising a holder for the article to be measured, a carrier, a series of graded gages mounted on said carrier and movable into engagement with said article, a pneumatic device for controlling the movement of the gages, and a feeler in operative relation to said gages for controlling the pneumatic device.

22. A machine of the character described comprising a holder for the article to be measured, a carrier having a series of movable gages, a pneumatic device for moving the gages, a regularly automatically moving valve controlling the passage of air to said pneumatic device, a feeler in operative relation to the gages, and supplemental devices controlled by the feeler for cutting the first said supply to the pneumatic device when a gage corresponding to the pivot is presented thereto.

23. A machine of the character described comprising a pivot-holder having relatively movable members, a series of automatically-acting measuring devices, each having an aperture of a known diameter, and means for bringing said pivots and said apertures successively into alinement.

24. A machine of the character described comprising a pivot-holder, a series of measuring devices, each consisting of a jewel having an aperture of a predetermined diameter, and automatic devices for moving and presenting them successively to the pivot.

25. A machine of the character described comprising a holder having means for clamping a pivot, a series of measuring devices, each having an aperture of a known diameter different from that of any of the others, and mechanism including a movable carrier for engaging said devices with the pivot, in order beginning with that having the aperture of the largest diameter.

26. A machine of the character described, comprising a recording device, a series of graded gages, mechanism for automatically presenting said gages one by one to the pivot to be measured, and mechanism for operating the recording device when a gage corresponding to the pivot is presented thereto.

27. A machine of the character described, comprising a work-holder, a series of graded gages, mechanism for presenting said gages one by one to the work carried by said holder, devices for holding a record-sheet, and devices for making a record of the diameter of each piece of work upon the sheet.

28. A machine of the character described, comprising a work-holder having relatively movable members, a series of graded gages, mechanism for presenting said gages one by one to the work carried by said holder, and a device having symbols designating the internal diameters of the gages and moving simultaneously with the gages.

29. A machine of the character described, comprising a work-holder, a series of graded gages, mechanism for presenting said gages, one by one, to the pivot, a device having symbols designating the internal diameters of the gages, and moving simultaneously with the gages, and mechanism for bringing a record-sheet against a symbol when a gage corresponding to the pivot is presented thereto.

30. A machine of the character described having provisions for automatically measuring and recording the diameter of a predetermined number of pivots in succession, and provisions for stopping the machine automatically when the diameters of said pivots have been recorded.

31. A machine of the character described comprising two independent sets of measuring devices and a carrier located between said sets of measuring devices for presenting the two pivots of a balance-wheel or other part of a watch simultaneously to the said devices.

32. A machine of the character described comprising a holder for the pivots to be measured, means for supporting a record-sheet, two independent sets of oppositely-arranged graded gages, and mechanism controlled by said gages for recording on said record-sheet the measurements of the pivots.

33. A machine of the character described comprising measuring devices, and a carrier for presenting the pivots to the said devices, said carrier consisting of two separable clamps having alined apertures to receive the pivots whereby said pivots are held rigidly while being measured.

34. A machine of the character described, comprising a pivot-carrier, two independent sets of measuring devices, means for supporting a record-sheet, a device having two sets of symbols, and placed in operative relation to the record-sheet, a feeler for each set of gages, and two independent hammers each controlled by one of the feelers, and each arranged to strike the record-sheet against one of the symbols.

35. A machine comprising recording mechanism, devices for measuring the diameter of the thing to be measured, means for automatically presenting the thing to be measured to the measuring device, and mechanism for operating the recording mechanism when the said thing is measured.

36. A machine comprising mechanism, for measuring the diameter of the thing to be measured and for recording the measurements, means for automatically presenting the thing to be measured to the measuring device, and mechanism controlled by the measuring devices for automatically operating the recording mechanism.

37. A machine of the character specified comprising a holder for the articles to be measured, a plurality of gages, a carrier for said gages, means for moving said gages to present them one by one to one of said articles, and means for moving said holder to present said articles in succession to said gages.

38. A machine of the character described comprising a holder for the article to be measured, measuring devices for ascertaining the diameter of said article, and pneumatic mechanism for automatically causing said devices to measure said article.

39. A machine of the character described comprising a holder having relatively movable members for the article to be measured, a plurality of gages, said article and said gages being adapted to pass one into the other, and means for causing said gages to successively move into operative relation to said article while it is in the holder without dislocating said article.

In testimony whereof I have affixed my signature in presence of two witnesses.

DUANE H. CHURCH.

Witnesses:
MARCUS B. MAY,
P. W. PEZZETTI.